United States Patent
Xiaoxian

(10) Patent No.: US 11,992,159 B2
(45) Date of Patent: May 28, 2024

(54) ELECTRIC GRINDER

(71) Applicant: Zhuhai Kelitong Electronic Co., Ltd., Zhuhai (CN)

(72) Inventor: Song Xiaoxian, Zhuhai (CN)

(73) Assignee: Zhuhai Kelitong Electronic Co., Ltd, Zhuhai (CN)

( * ) Notice: Subject to any disclaimer, the term of this patent is extended or adjusted under 35 U.S.C. 154(b) by 0 days.

(21) Appl. No.: 17/854,893

(22) Filed: Jun. 30, 2022

(65) Prior Publication Data
US 2023/0380630 A1    Nov. 30, 2023

(30) Foreign Application Priority Data

May 31, 2022 (CN) .......................... 202221341721.5

(51) Int. Cl.
| | |
|---|---|
| A47J 42/30 | (2006.01) |
| A47J 42/38 | (2006.01) |
| A47J 42/46 | (2006.01) |
| A47J 42/50 | (2006.01) |

(52) U.S. Cl.
CPC .............. *A47J 42/50* (2013.01); *A47J 42/46* (2013.01)

(58) Field of Classification Search
CPC .. A47J 42/38; A47J 42/50; A47J 42/06; A47J 42/16; A47J 42/26
See application file for complete search history.

(56) References Cited

U.S. PATENT DOCUMENTS

| 2020/0022406 A1* | 1/2020 | Grant ....................... A47J 42/34 |
| 2022/0039599 A1* | 2/2022 | Abehasera .............. A47J 42/28 |

FOREIGN PATENT DOCUMENTS

| CN | 201420342410 | | 11/2014 |
| CN | 201420823650.1 | | 4/2019 |
| CN | 209186447 | | 8/2019 |
| CN | 212015352 U | * | 11/2020 |
| CN | 212015352 U | | 11/2020 |
| CN | 113693459 A | | 11/2021 |
| CN | 216020621 U | | 3/2022 |
| CN | 217659419 U | | 10/2022 |

OTHER PUBLICATIONS

English translate (CN212015352U), retrieved date Jul. 13, 2023.*
Hinged Lid, retrieved date Jul. 14, 2023. https://www.amazon.com/Server-Products-80310-Accessory-Stainless/dp/B002U30JVU/ref=asc_df_B002U30JVU/?tag=hyprod-20& linkCode=df0&hvadid=194831993644&hvpos=&hvnetw=g&hvrand=2217472493729506978&hvpone=&hvptwo=&hvqmt=&hvdev=c&hvdvcmdl=&hvlocint=&hvlocphy=9059726&hvt.*

* cited by examiner

*Primary Examiner* — Matthew Katcoff
*Assistant Examiner* — Mohammed S. Alawadi
(74) *Attorney, Agent, or Firm* — Boyle Fredrickson, S.C.

(57) ABSTRACT

An electric grinder is provided that includes a shell. The shell accommodates a grinding mechanism, a reducing mechanism and a power mechanism. The electric grinder also comprises a grinding chamber, where said grinding mechanism is at one end of said grinding chamber, said power mechanism and said reducing mechanism are at the other end of said grinding chamber. The grinding chamber is provided with a filling hole, and a chamber cover is provided opposite to said filling hole. The filling hole of said grinding chamber can be opened or closed by turning said chamber cover. The electric grinder is designed so that the filling hole of the grinding chamber can be easily opened or closed by turning the chamber cover. After the chamber cover rotates and closes the filling hole, the grinding chamber is sealed and no material will flow out easily, and the chamber cover will not fall off.

7 Claims, 5 Drawing Sheets

ELECTRIC GRINDER

CROSS-REFERENCE TO RELATED APPLICATION

This application claims priority to Chinese Patent Application 202221341721.5 filed on May 31, 2022, the entire contents of which are hereby expressly incorporated by reference into the present application.

TECHNICAL FIELD

This invention relates to the technical field of daily life utensils, especially an electric grinder.

BACKGROUND ART

Since processed ground pepper, pepper salt, etc. available on the market differ greatly from freshly ground seasonings in flavor, an increasing number of consumers choose pepper grinders. By buying complete pepper particles and grinding them in a grinder, they can get natural and fresh ground pepper, pepper salt, etc.

Since the grinder is generally a small household device, the grinding chamber is generally small, and the pepper particles inside the grinding chamber need to be refilled after grinding, so it is necessary to design an electric grinder that can be easily refilled. The Chinese utility model with publication number of CN212015352U and publication date of Nov. 27, 2022 discloses a portable refillable grinder, where said grinding device comprises a grinding shell and a grinding chamber located in the upper part of the grinding shell, said top is provided with a filling chamber, the bottom of the filling chamber is provided with a filling pipe whose lower end extends and is connected with the grinding chamber. Due to the design of the filling chamber and filling pipe, the material can be quickly filled from the filling chamber and reach the grinding chamber through the filling pipe. The utility model also discloses that "a filling hole (2G) and a filling cover (2H) mounted on the filling hole (2G) are mounted on the side wall of said grinding chamber (2F). Said filling cover (2H) is provided with side stoppers (2K) on both sides, and the lower end of the filling cover (2H) is movably hinged to the lower part of the filling hole (2G)".

In view of the small diameter of the filling pipe, such design may lead to blockage of the filling pipe, which is not convenient for filling, and the lower end of the filling cover is hinged with the lower part of the filling hole, so it is not easy to open and close the filling cover manually, which is inconvenient for the consumers.

What is needed is an electric grinder that addresses any of the shortcomings of the prior art discussed above.

SUMMARY OF INVENTION

This present invention provides an electric grinder with a filling cover which can be easily opened and closed, and is implemented by the following technical solution: An electric grinder comprising a shell, wherein said shell is provided internally with a grinding mechanism, a reducing mechanism and a power mechanism, and also comprises a grinding chamber; said grinding mechanism is set at one end of said grinding chamber, said power mechanism and said reducing mechanism are set at the other end of said grinding chamber, said grinding chamber is provided with a filling hole, and a chamber cover provided opposite to said filling hole, wherein the filling hole of said grinding chamber can be opened or closed by turning said chamber cover.

Such design has the following advantages: The filling hole of the grinding chamber can be easily opened or closed by turning the chamber cover, which is easy and convenient to operate. After the chamber cover rotates and closes the filling hole of the grinding chamber, the grinding chamber will be well sealed and no material will flow out easily.

Further, said chamber cover is provided with a snap, where said chamber cover is detachably connected to said grinding chamber through said snap.

Such design can ensure that the chamber cover will not fall off easily after the filling hole of the grinding chamber is closed by turning the chamber cover.

These and other aspects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof. It is hereby disclosed that the invention includes all such modifications.

Reference numbers in the attached drawings: 1. shell; 2, grinding mechanism; 3. reducing mechanism; 4. power mechanism; 5. grinding chamber; 6. filling hole; 61. limiting part; 62. notch; 63. slot; 64. projection; 7. chamber cover; 71. snap; 72. recess; 73. annular edge; 74. rotating handle; 8. transmission shaft; 9. battery pack.

SPECIFIC EMBODIMENTS

This invention is described further as follows by reference to the attached drawings and specific embodiments.

Figure 1:
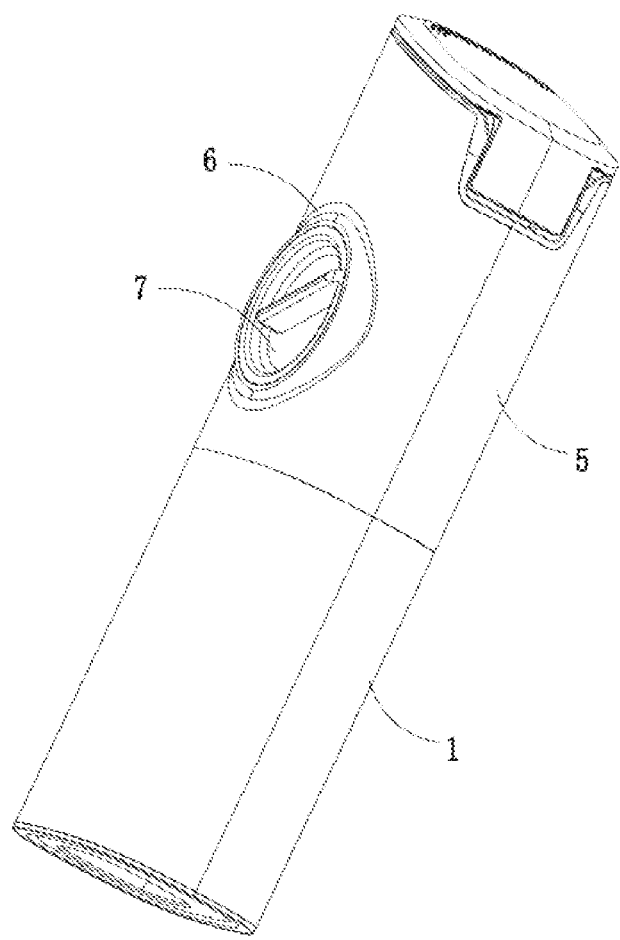
FIG. 1 is a perspective view of the overall structural diagram of this invention.
Figure 6:
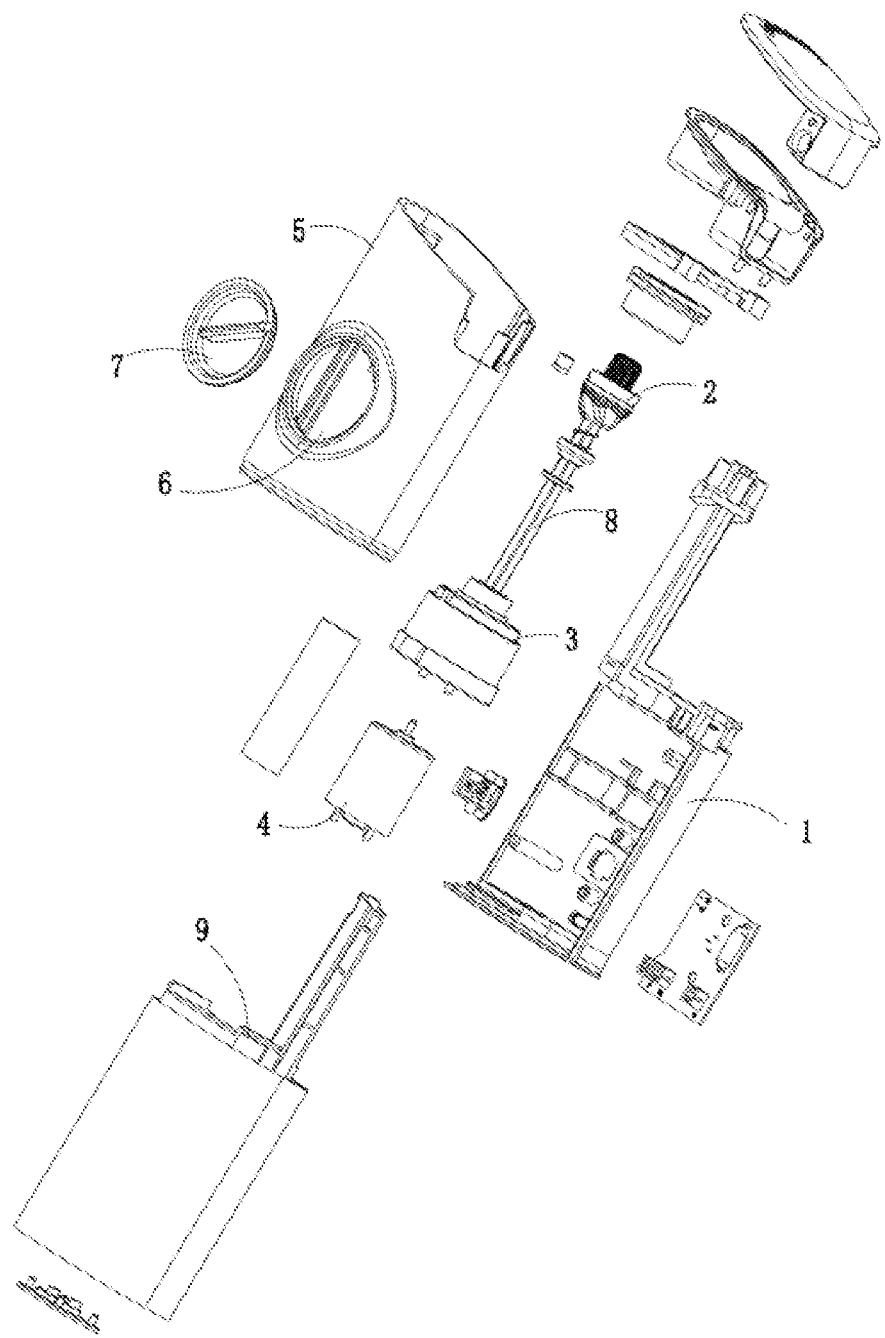
FIG. 6 is an exploded perspective view of this invention.

As shown in FIG. 1 and FIG. 6, which are the overall structural diagram and overall exploded view of the electric grinder, the electric grinder provided in this embodiment comprises a shell 1, wherein said shell 1 accommodates a grinding mechanism 2, a reducing mechanism 3 and a power mechanism 4, and also comprises a grinding chamber 5, where said grinding mechanism 2 is set at one end of said grinding chamber 5, and said power mechanism 4 and said reducing mechanism 3 are set at the other end of said grinding chamber 5. During use, pepper particles and sea salt particles etc. are loaded into the electric grinder, and the grinding mechanism 2 is driven by the power mechanism 4 and the reducing mechanism 3 to implement the automatic grinding function of the electric grinder.

Figure 2:
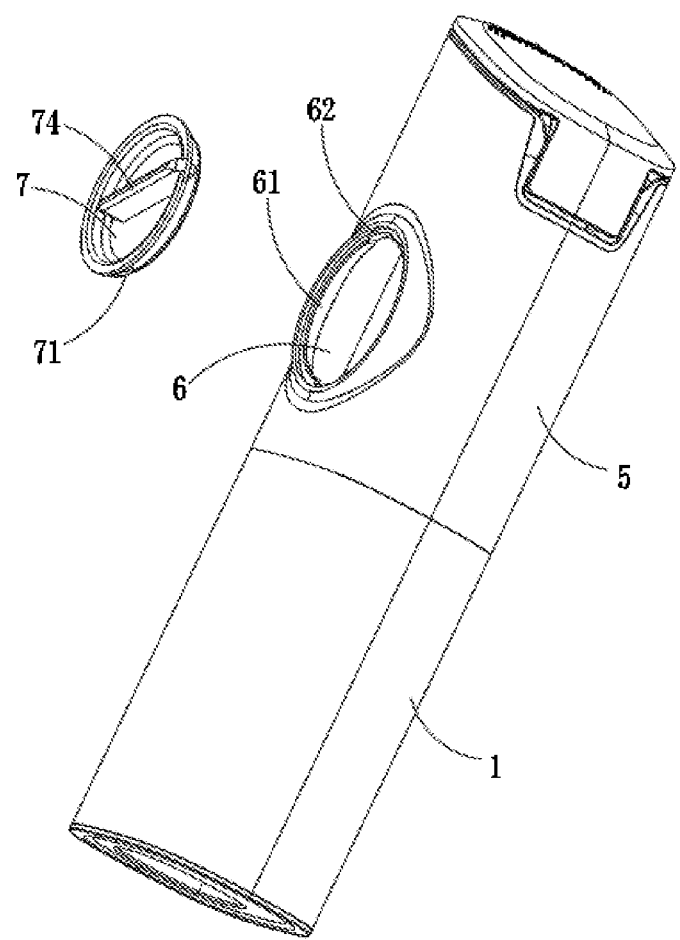
FIG. 2 is an exploded perspective view of the structural diagram of this invention with a chamber cover separated from a filling hole.

In further combination with FIG. 2, said grinding chamber 5 is provided with a filling hole 6, and a chamber cover 7 provided opposite to said filling hole 6, and the filling hole 6 of said grinding chamber 5 can be opened or closed by turning said chamber cover 7. The filling hole 6 can be easily opened or closed by turning the turnable chamber cover 7, which is easy and convenient to operate. After the chamber cover 7 rotates and closes the filling hole 6 of the grinding chamber 5, the grinding chamber 5 will be well sealed and no pepper particles or sea salt particles will flow out easily from the filling hole 6.

Figure 3:
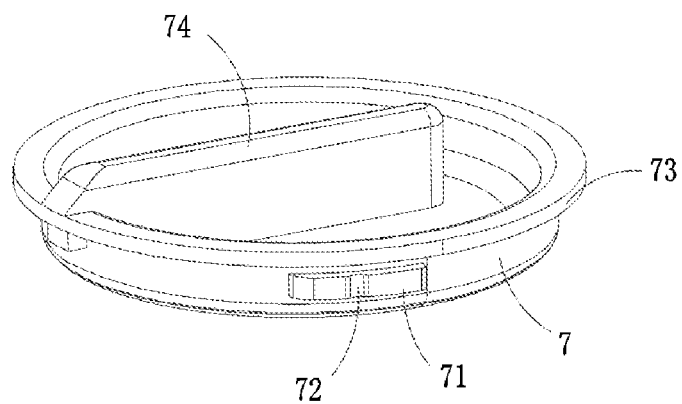
FIG. 3 is a perspective view of the structural diagram of the chamber cover of this invention.

As a selected embodiment, referring to FIG. 3, said chamber cover 7 is provided with a snap 71, and said chamber cover 7 is detachably connected to said grinding chamber 5 through the snap 71. When it is necessary to seal the grinding chamber 5, the chamber cover 7 is easily fastened onto the filling hole 6 of the grinding chamber 5 through the snap 71. There may be two said snaps 71, which are mounted symmetrically on said chamber cover 7.

Figure 5:
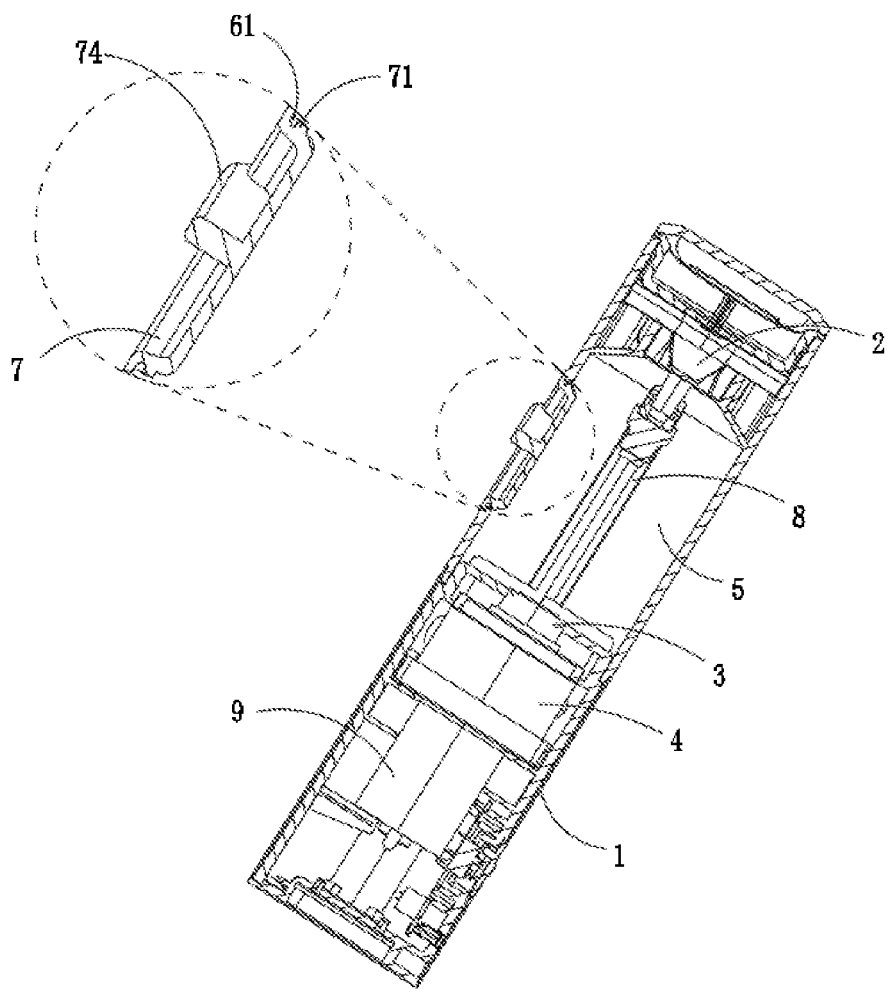
FIG. 5 is the cutaway elevation view of the overall profile of this invention.

As shown in FIG. 2 and FIG. 5, in order to fit the chamber cover 7 closely at the filling hole 6 of the grinding chamber 5, said filling hole 6 is provided with a limiting part 61, where said limiting part 61 is mounted at the inner edge of said filling hole 6. Such design can ensure that after the bottom of the chamber cover 7 extends into the filling hole 6 on the grinding chamber 5, the snap 71 on said chamber cover 7 can be interlocked with the limiting part 61 on the grinding chamber 5, and the chamber cover 7 will not easily fall out of the filling hole 6 on the grinding chamber 5.

With further reference to FIG. 2, a notch 62 is provided on said limiting part 61, where said notch 62 has a width greater than the width of said snap 71. There are two said notches 62, which are mounted symmetrically on said limiting part 61. When the snap 71 of the chamber cover 7 is aligned with the notch 62 of the limiting part 61, the bottom of the chamber cover 7 can extend into the grinding chamber 5 and cover the filling hole 6 of the grinding chamber 5, and the snap 71 of the chamber cover 7 is fastened on the limiting part 61 of the grinding chamber 5 by turning the chamber cover 7 further to ensure that the chamber cover 7 will not fall off from the filling hole 6 of the grinding chamber 5.

With reference to FIG. 5 and FIG. 6, said limiting part 61 is further provided with a slot 63 on the side facing the inside of said grinding chamber 5, said slot 63 is connected to said notch 62, and said slot 63 fits with said snap 71. Such design will ensure that the snap 71 will be housed in the slot 63 after the chamber cover 7 is turned further when the snap 71 is aligned with the notch 62 of the limiting part 61, and extended into the grinding chamber 5 from the notch 62. The slot 63 could hold the snap 71 to prevent the chamber cover 7 from moving, and thus improve the closing stability between the chamber cover 7 and the filling hole 6.

Figure 4:
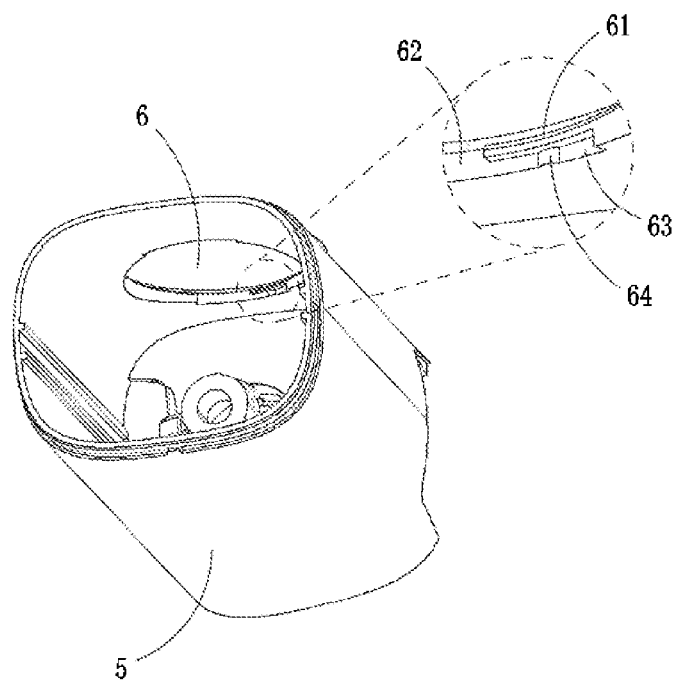
FIG. 4 is a perspective view of the structural diagram of a grinding chamber of this invention.

With further reference to FIG. 3 and FIG. 4, said snap 71 is provided with a recess 72 on the side wall, said slot 63 is provided with a projection 64 on the side wall, and said recess 72 fits with said projection 64. Such design will ensure that the recess 72 on the snap 71 is fastened on the projection 64 in the slot 63 when the snap 71 is housed in the slot 63 by turning the chamber cover 7, which further holds the chamber cover 7 to prevent the chamber cover 7 from moving and close the chamber cover 7 tighter.

Specifically, said projection 64 is an arc-shaped block, said recess 72 is an arc-shaped slot, and said snap 71 is provided with an arc-shaped portion at the end first in contact with said projection 64, which reduces the resistance of the projection 64 to the snap 71 and facilitates turning the chamber cover 7 to align the recess 72 with the projection 64.

With reference to FIG. 3 and FIG. 5, said chamber cover 7 comprises an annular edge 73, and said snap 71 and said annular edge 73 are spaced apart to snap on said limiting part 61 on the inner and outer sides. When the chamber cover 7 is closed at the filling hole 6, the annular edge 73 of the chamber cover 7 leans against the outer side of the limiting part 61, while the snap 71 is housed in the slot 63 on the inner side of the limiting part 61. In this way, the chamber cover 7 will be held in the inner and outer directions, which will ensure that the chamber cover 7 will not fall off from the filling hole 6 of the grinding chamber 5.

The rotating handle 74 is mounted above the chamber cover 7, and the chamber cover 7 can be rotated by turning the rotating handle 74, where the rotating handle 74 can be a solid structure or a hollow structure. Such design makes it easier to remove the chamber 7 from the filling chamber.

As a selected embodiment, please refer to FIG. 4 and FIG. 5 in which a transmission shaft 8 is mounted in said grinding chamber 5, where one end of said transmission shaft 8 is connected to said reducing mechanism 3, and the other end of said transmission shaft 8 is connected to said grinding mechanism 2. The shell 1 is further provided with a battery pack 9, where said battery pack 9 is electrically connected to said power mechanism 4.

The electric grinder provided in this invention is so designed that the filling hole 6 of the grinding chamber 5 can be easily opened or closed by turning the chamber cover 7, which is easy and convenient to operate. After the chamber cover 7 rotates and closes the filling hole 6 of the grinding chamber 5, the grinding chamber 5 will be well sealed and no material will flow out easily, and the chamber cover 7 will not fall off easily.

The above detailed description is a specific description of feasible embodiments of the present patent. These embodiments are not intended to restriction the scope of the present patent, and any equivalent embodiment or change not deviating from the present patent is included in the scope of the present invention.

It should be noted that for those ordinarily skilled in the art, some transformations and improvements can be made without departing from the conception of the present invention, all of which are within the scope of protection of the present invention. Therefore, the scope of protection of the present invention should be based on the attached claims.

It should also be understood that the components of the system and associated components may be made of any number of different materials and in many different shapes.

Additionally, it should be understood that the various inventive features described above can each be used independently of one another or in combination with other features.

It is appreciated that many changes and modifications could be made to the invention without departing from the spirit thereof. Some of these changes will become apparent from the appended claims. It is intended that all such changes and/or modifications be incorporated in the appending claims.

What is claimed is:

1. An electric grinder, comprising:
    a shell accommodating:
        a grinding chamber provided with a filling hole,
        a grinding mechanism set at a first end of the grinding chamber,
        a reducing mechanism at a second end of the grinding chamber opposite the first end, and
        a power mechanism at the second end of the grinding chamber, a chamber cover provided opposite to the filling hole, wherein the chamber cover is provided with a snap and wherein the chamber cover is detachably connected to the grinding chamber through the snap;

a limiting part mounted on the filling hole, wherein the limiting part is arranged on the inner edge of the filling hole, and wherein the snap is detachably connected to the limiting part;

a notch on the limiting part, wherein the notch has a width greater than the width of the snap;

wherein the filling hole of the grinding chamber can be opened or closed by turning the chamber cover;

wherein the limiting part is further provided with a slot on the side facing the inside of the grinding chamber, wherein the slot is connected to the notch, and wherein the slot fits with the snap.

2. The electric grinder of claim 1, wherein the snap is provided with a recess on the side wall, wherein the slot is provided with a projection on the side wall, and wherein the recess fits with the projection.

3. The electric grinder of claim 2, wherein the chamber cover comprises an annular edge, and wherein the snap and the annular edge are spaced apart to snap on the limiting part on the inner and outer sides.

4. The electric grinder of claim 1, further comprising a rotating handle mounted on the chamber cover.

5. The electric grinder of claim 1, further comprising a transmission shaft mounted in the grinding chamber, wherein a first one end of the transmission shaft is connected to the reducing mechanism, and wherein a second end of the transmission shaft is connected to the grinding mechanism.

6. The electric grinder of claim 1, wherein the filling hole of the grinding chamber can be opened or closed by rotating the chamber cover relative to the shell.

7. The electric grinder of claim 6, wherein the chamber cover is rotated relative to an axis extending laterally through the shell.

* * * * *